United States Patent [19]
Nichols et al.

[11] Patent Number: 6,038,492
[45] Date of Patent: Mar. 14, 2000

[54] ITEM DISPENSING SYSTEM

[75] Inventors: David F. Nichols; Joseph C. Perin, Jr., both of Cincinnati, Ohio

[73] Assignee: Interlott Technologies, Inc., Cincinnati, Ohio

[21] Appl. No.: 09/325,082

[22] Filed: Jun. 3, 1999

Related U.S. Application Data

[62] Division of application No. 09/039,073, Mar. 13, 1998.

[51] Int. Cl.[7] .................................................. G06F 17/00
[52] U.S. Cl. ........................ 700/232; 221/2; 221/7; 221/8; 705/21; 235/381
[58] Field of Search ..................... 221/2, 7, 8; 700/232, 700/233, 235, 236; 705/21

[56] References Cited

U.S. PATENT DOCUMENTS

| | | | |
|---|---|---|---|
| 4,473,884 | 9/1984 | Behl | 221/2 |
| 4,589,069 | 5/1986 | Endo et al. | 705/21 |
| 5,128,862 | 7/1992 | Mueller | 700/233 |
| 5,207,368 | 5/1993 | Wilfong et al. | 221/7 |
| 5,927,541 | 7/1999 | Stoken et al. | 221/2 |

*Primary Examiner*—Christopher P. Ellis
*Assistant Examiner*—Joe Dillon, Jr.
*Attorney, Agent, or Firm*—Wood, Herron & Evans, L.L.P.

[57] ABSTRACT

An item dispensing system having modular and distributed components that are suitable for use at POS counter. Item dispensing units are placed beneath the counter and are electrically connected by a cable to a retailer keypad and display which, in turn, is electrically connected by a cable to a customer keypad and display. A panel having images representing the available games to be played is applied to the top of the counter surface. Thus, a customer can easily pay for and select items to be purchased. Items are automatically dispensed, collected by the retail clerk and provided to the customer.

7 Claims, 6 Drawing Sheets

ITEM DISPENSING SYSTEM

This is a div. of Ser. No. 09/039,073 filed Mar. 13, 1998.

BACKGROUND OF THE INVENTION

This invention relates generally to the field of dispensing systems and more particularly, to an improved item dispensing system.

State sponsored lotteries are a popular and accepted method of generating revenue in place of, or in addition to, taxes. One form of lottery uses instant lottery tickets on which number combinations are preprinted before distribution, thereby permitting the player to immediately view the ticket and know whether he/she is a winner. One system of distributing instant lottery tickets is entirely clerical with the tickets being stored in a drawer and counted out by hand. The clerk typically is responsible for keeping track of the number of tickets sold, making redemption payments and providing such sales and payout information to the State. The State then pays the store owner a commission or other monies due. Such a system has the disadvantages of being completely manual and requiring clerical assistance for the entire transaction. Further, the system has no significant security and is susceptible to shrinkage, that is, theft and accounting errors that result in lost revenue and tickets.

Another system for distributing instant lottery tickets is the individual ticket vending machine, which is a stand alone, unattended automated ticket dispenser. The vending machine accepts the customer's cash or credit card payment and provides a selection of lottery tickets corresponding to the payment. The customer then makes various ticket selections having a value equaling the payment. The vending machine monitors the ticket selections and dispenses the lottery tickets selected by the customer. Such a vending machine has the advantages of not requiring the attention of a clerk, being very secure, and providing a high level of reporting by keeping track of how often the machine is accessed to be loaded and serviced, when and how much money is collected, when and which tickets have been selected, etc. Further, the vending machine may be connected via an electronic communications network to a central location which can monitor the activity of the machine. The vending machine may also include a printer for printing reports of machine activity. While the above vending machine has many advantages over the clerical method of distributing instant lottery tickets, it has several disadvantages. For example, the machine unit is an integrated unit and may be relatively large such that its physical size limits its placement at point-of-sale ("POS") locations. Such a large unit is not suitable for location at counter check out lines. Further, such vending machines also generally have only a single level of security; and hence, all accounting information collected by the vending machine is available to anyone who has security access to the machine.

Therefore, there is a need to provide a dispensing system that is more convenient to the retailer and the customer, preferably is more suitable for a check out counter location and avoids the problems of shrinkage and theft while providing detailed accounting and reporting of transactions.

SUMMARY OF THE INVENTION

The present invention provides a more compact, flexible, simple, inexpensive and reliable item dispensing system. The present invention provides a distributed, scalable item dispensing system that is especially suitable for point-of-sale check out counters. The dispensing system of the present invention has the advantage of providing an item dispensing POS system that is especially useful for dispensing gaming tickets from a vending machine.

According to the principles of the present invention in accordance with one presently preferred embodiment, an item dispenser is adapt to be integrated with a point-of-sale counter for dispensing items in response to selections made by a customer. A customer unit is placed at a first location with respect to the point-of-sale counter and has an input device permitting a customer to select an item for purchase. An item dispenser is in electrical communication with the customer unit and is placed in a second location with respect to the point-of-sale counter different from the first location. The item dispenser dispenses the item in response to the customer selecting the item using the input device on the customer unit. In one aspect of the invention, a retailer unit that is in electrical communication with the customer unit and the item dispenser functions with the customer unit to cause the item dispenser to dispense the item.

In another embodiment of the invention, a method of dispensing items at a point-of-sale counter comprises the steps of entering into a retailer unit a payment value for a purchase of items by a customer, the retailer unit being placed at a first location with respect to the point-of-sale counter. Next a payment value is transmitted from the retailer unit to a customer unit in electrical communication with the retailer unit, the customer unit being placed at a second location with respect to the point-of-sale counter different from the first location. The payment value is displayed by the customer unit, a selection of an item to be purchased is entered into the customer unit using the payment value, and then an item dispenser located with respect to the point-of-sale counter dispenses the item.

By placing the item dispensing system at a POS check out counter, items, for example, gaming tickets, are exposed to substantially more potential customers than is possible with the current integrated automated ticket vending machines with the advantage that substantially increased game sales can be expected.

These and other objects and advantages of the present invention will become more readily apparent during the following detailed description taken in conjunction with the drawings herein.

DETAILED DESCRIPTION OF THE INVENTION

Figure 1:
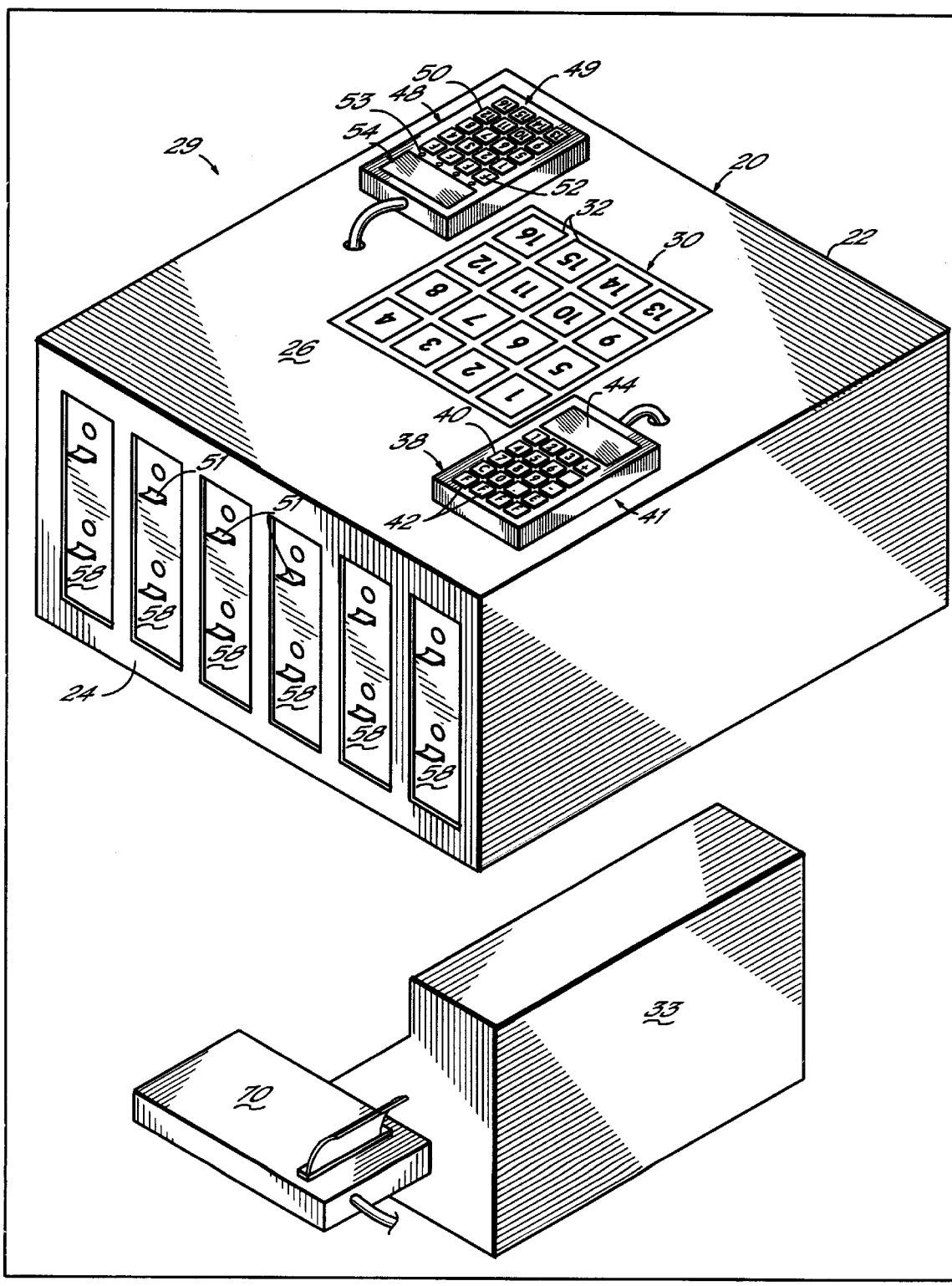
FIG. 1 is a partial perspective view of a counter having a ticket dispensing system in accordance with the principles of the present invention.

Referring to FIG. 1, a counter 20, for example, a point-of-sale retail checkout counter, has a customer side 22 and a retailer or clerk side 24. The counter 20 has an upper surface 26, which is normally a working surface on which items to be purchased are normally placed. In addition, point-of-sale displays and other items (not shown) are often placed on the working surface 26. A clerk standing on the retailer side 24 of the counter 20, scans or otherwise enters the items and their prices into a retailer point-of-sale terminal 33 and accepts the customer's payment for the goods by credit card or cash. In accordance with the present invention, an item dispensing system 29 is integrated into the counter 20. In the example to follow, the item dispensing system will be described as a gaming ticket dispensing system; however, as will be appreciated, the disclosed dispensing system may be used to dispense many different items that can be compactly stored in bulk, for example, other types of tickets, phone cards, stamps, cards or any other items capable of being relatively compactly inventoried and automatically dispensed.

A game display panel 30 is located on and normally removably attached to, the upper surface 26. The panel 30 has a predetermined number, for example, sixteen samples of game tickets 32, for example, instant lottery tickets displayed for view by the customer. The game ticket samples 32 are normally presented in the panel 30 in an attractive, easy to read display (such as in arrayed locations 1 through 16 shown in FIG. 1, as an example) so that the tickets catch the eye of the customer and clearly identify the game and its value.

If a customer desires to purchase game tickets, the customer pays the clerk with cash or credit card. The amount of the ticket purchase is entered by the clerk into the retailer terminal 33 and a retailer access module ("RAM") or unit 38. The retailer unit 38 is a self contained, stand-alone unit located at a first location with respect to the POS counter 20, for example, in the proximity of the retailer side 24 of the counter 20. The module 38 has an alphanumeric display 44 and an input device 41, for example, a keypad, with assorted numeric keys 40 and a selection of function keys 42 to facilitate the transaction. Upon entering the amount of the transaction in the module 38, the retailer module 38, in electrical communication with a customer access module ("CAM") or unit 48, transmits the payment value, that is, an available credit amount, to the customer module 48. The customer module 48 is a self contained, stand-alone unit located at a second location with respect to the POS counter 20 different from the first location. The customer module 48 is normally located proximate the customer side 22 of the counter 20 in a position convenient to the customer. The module 48 has an alphanumeric display 54 and an input device 49, for example, a keypad, with a number of numeric keys 50 corresponding to the number of displayed games 32 and nonnumeric function keys 52. Each of the numeric keys has an LED 53 next to the key, and illumination of the LED indicates that the game associated with that key may be played. Upon the available credit being displayed in display 54, utilizing the numeric keys 50, the customer selects the desired game tickets corresponding to the displayed game tickets 32. As each selection is made, one or more items or tickets 51 are dispensed from item or ticket dispensers 58 located at a third location with respect to the POS counter 20. The ticket dispensers 58 are normally located below the upper surface 26 of the counter 20 and oriented so that the tickets are dispensed toward the retailer side 24 of the counter 20. Thus, the dispensers 58 are normally located at a third location with respect to the counter 20 that is different from the first and second locations. After the tickets are dispensed, the remaining customer credit, that is, the amount of the purchase less the value of the item selected, is displayed in both the display 44 of the retailer module 38 and the display 54 of the customer module 48. Therefore, the customer can easily determine how many more tickets may be selected to equal the available credit. After all the tickets have been selected, the clerk then collects the dispensed tickets 51 from the dispensers 58 and gives the tickets 51 to the customer.

Figure 2:
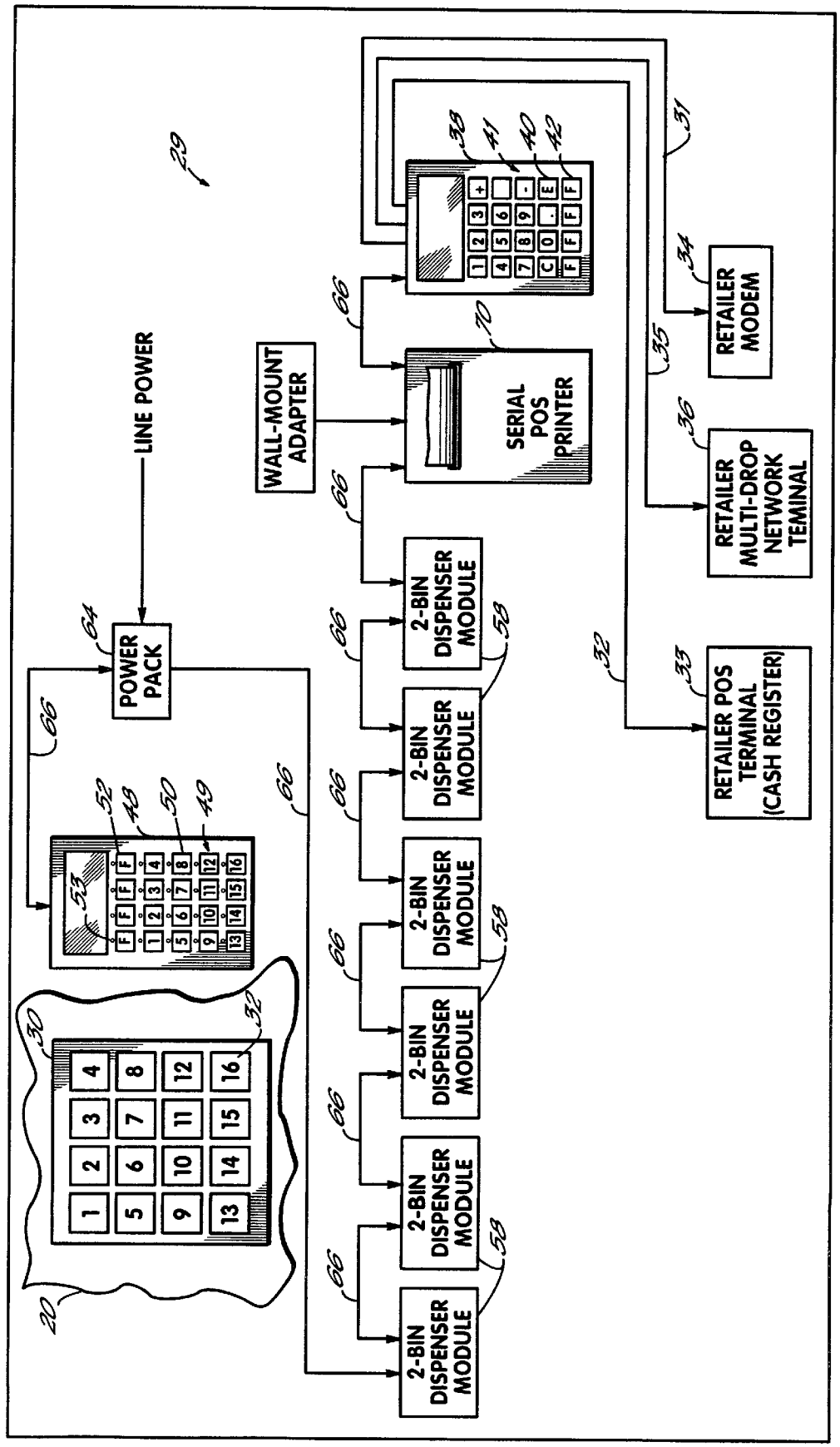
FIG. 2 is a schematic block diagram of the components of the ticket dispensing system illustrated in FIG. 1.

FIG. 2 is a schematic block diagram of the ticket dispensing system 29 illustrated in part in FIG. 1. Power is provided to the retailer and customer modules 38, 48, respectively, and the ticket dispensers 58 by a power supply 64. The power supply is designed to be connected to an AC power outlet normally found in retail establishments. Power is transferred to, and data is transferred between, the various components of the dispensing system 29 by means of cables 66, each of the cables 66 having eight conductors. The access modules 38, 48, ticket dispensers 58 as well as other components, for example, a serial POS printer 70, have pass through ports; and therefore, the cables may interconnect the components in a daisy chain manner, thereby providing complete modularity and scalability. With such a daisy chain architecture, any number of ticket dispensers 58 from one to the design maximum number, for example, 16, may be connected to the dispensing system 29 using the cables 66.

The power supply 64 provides an output DC voltage, for example, +15 VDC, which is supplied on two conductors of the eight conductor cables 66. One of the +15 VDC conductors is combined with a ground to form a first twisted pair. One conductor provides a serial data line and is combined with a ground to form a second twisted pair. Another conductor provides a serial clock line and is in a third twisted pair with a ground. The eighth wire is used to provide a signal from the dispensers 58 to the retail module 38 and is in a fourth twisted pair with the other +15 VDC line. For example, the dispensers 58 may provide a signal over the eighth wire indicating that a dispenser drawer or door is opened. Data is transferred across the cables 66 using a two wire "I²C-BUS" protocol from Phillips Semiconductors which is commercially available from Arrow Electronics of Centerville, Ohio. The "I²C-BUS" is a widely used, highly flexible and cost effective serial protocol that is often used in consumer electronics equipment and has been used in point-of-sale terminals. Under the protocol, data is transferred in packets between the retailer module 38 and customer module 48 and the dispensers 58. Data packet transfer occurs in response to commands and requests initiated by the retailer module 38.

Even though the retailer module 38, customer module 48 and dispensers 58 all have self-contained microprocessors, the retailer module 38 is the master control for the ticket dispensing system 29. The retailer module 38 provides initialization to the customer module 48 upon power up and further, provides ticket prices, ticket inventory and purchase amount to the customer module 48. Further, the retailer module 38 receives information relating to which keys the customer has pushed and provides instructions to the dispensers to dispense an appropriate number or selection of tickets.

Normally, the dispenser modules 58 include two separate storage and bursting mechanisms, that is, ticket dispensing mechanisms; and therefore, the illustrated six dispensers 58 provide the capability of dispensing tickets for twelve games. The ticket dispensers are substantially as described in U.S. Pat. No. 4,982,337 and PCT Application Ser. No. PCT/US97/0576, each of which is assigned to the assignee of the present invention, and the entirety of both applications is incorporated by reference herein.

Figure 3:
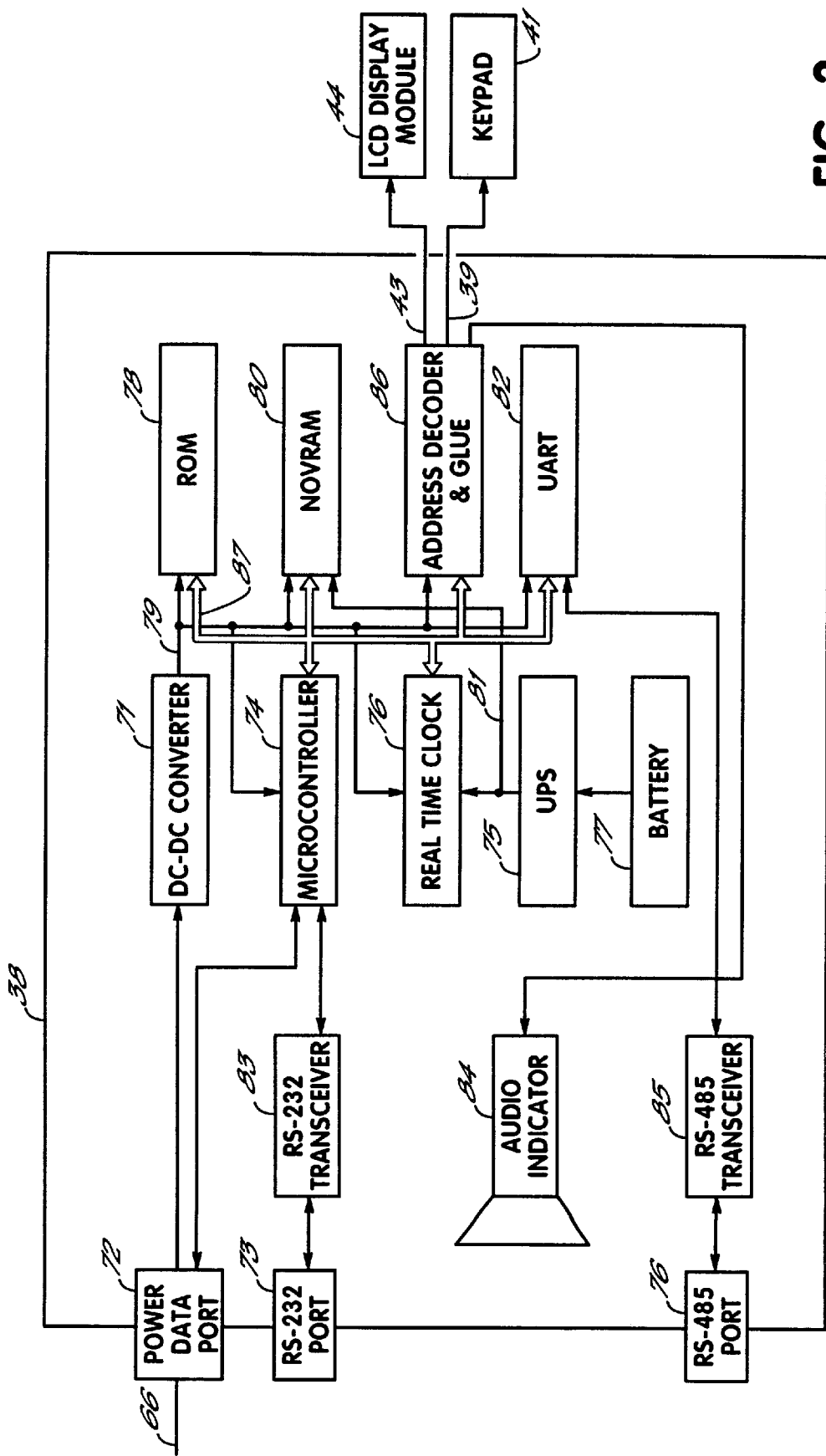
FIG. 3 is a detailed schematic diagram of a retailer access module in accordance with the principles of the present invention.

Referring to FIG. 3, the retailer access module 38 has a power/data port 72 connected to a cable 66, and RS-232 port 73 and an RS-485 port 76. The power conductors from the cable 66 are connected to a DC—DC converter 78. The DC—DC converter 78 has a first function of stepping down the +15 VDC to a lower level, for example, +5 VDC, with the appropriate regulation which is supplied to various components on power line 79. The power supply 64 of FIG. 2 provides the higher +15 VDC level across the cables 66 to reduce the current flow within the cables 66.

The retailer module 38 further includes a microprocessor 74, for example, Model No. 80C652 manufactured by Phillips Semiconductor and commercially available from Arrow Electronics of Centerville, Ohio. In addition, the module 38 includes a realtime clock 76, read-only memory ("ROM") 78, non-volatile random access memory ("NOVRAM") 80, a universal asynchronous receiver/transmitter ("UART") 82, an RS-232 transceiver 83, an RS-485 transceiver 85 and an audio indicator or speaker 84. The realtime clock 76 provides data and time information that is associated with a history of ticket sales. Thus, the ticket sales can be analyzed in reports by shift, by day, by week, etc. The retailer module 38 is electrically connected to the LCD display module 44 having two rows of 16 characters of display. An uninterruptable power supply 75 has a battery backup 77 and provides a continuous source of power on line 81 to the realtime clock 76 and the NOVRAM 80.

The retailer module 38 is also connected to the keypad 41 which includes 5 rows of keys 40 (FIG. 1) four columns wide that operate as 16 numeric keys and 4 nonnumeric function keys 42. An address decoder and glue circuit 86 receives input data on line 39 from the keypad 41 and provides output data on line 43 to the LCD display 44. The decoder and glue circuit 86 is a collection of digital and analog logic and interface circuitry that handles I/O functions to permit the microprocessor 74 to respond to and operate the display 44, keypad 41 and speaker 84. For example, the circuitry 86 decodes keystrokes from the keypad 41 into binary data that may be processed by the microcontroller 74. Further, the decoder circuit 86 receives binary data representing information to be displayed and converts that data to output signals that are appropriate for the LCD display 44. The decoder circuit 86 is also effective to provide audio output signals to the audio indicator or speaker 84, as required. The circuit 86 may be implemented using 7400 Series logic from Philips Semiconductor, Inc. The controller 74, ROM 78, NOVRAM 80, address decoder 86 and UART 82 are interconnected by address, data and control buses 87 in a known manner. In addition, the realtime clock 76 is also connected to the data and control buses.

Figure 4:
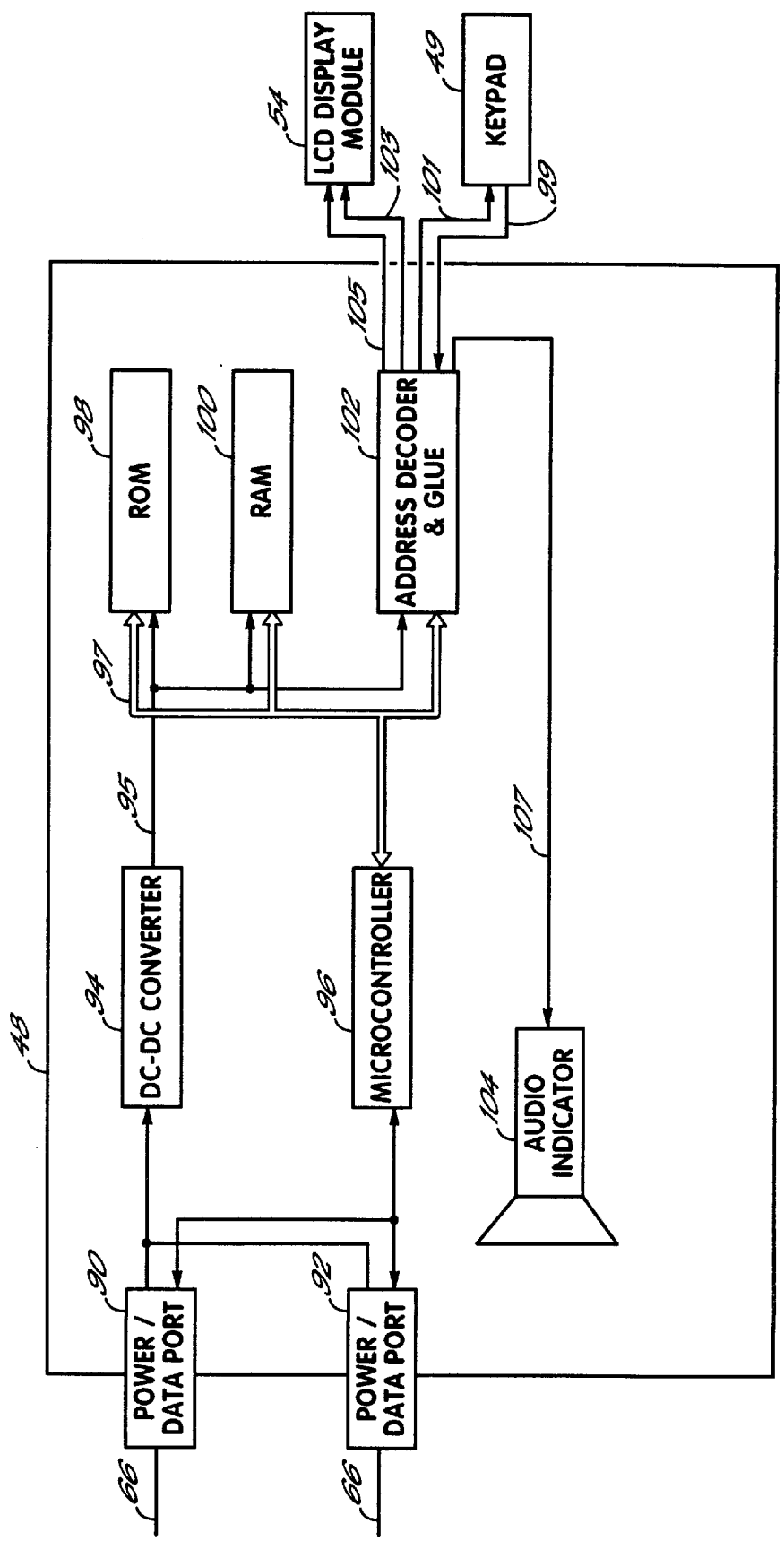
FIG. 4 is a detailed schematic diagram of a customer access module in accordance with the principles of the present invention.

Referring to FIG. 4, the customer access module 48 has a pair of pass-through power/data ports 90, 92 which are connected to the cables 66. A DC—DC converter 94 functions identically to the converter 71 of FIG. 3 and steps down the +15 VDC from the power supply 64 to +5 VDC. The +5 VDC is provided to the module components on power line 95. The customer module 48 includes a microcontroller 96 identical to the microcontroller 74 of the retailer module 38, ROM 98, RAM 100 and an address decoder and glue circuit 102. The microprocessor 96, ROM 98, RAM 100 and decoder circuit 102 are interconnected by address, data and control buses 97 in a known manner. The address decoder and glue circuit 102 handles the I/O functions associated with providing outputs to and receiving inputs from the display 54, keypad 49 and speaker 104. For example, the circuit 102 receives inputs on line 99 from a keypad 49 containing a 5 row by 4 column matrix of keys that provides 16 game keys 50 and 4 function keys 52. The decoder and glue circuitry 102 further provides output signals on line 101 to drive LEDs 53 associated with the keys on the keypad 49. In addition, the decoder and glue circuitry provides data on line 103 to the LCD display module 54 which is a 2 line by 16 character display. The decoder and glue circuitry 102 further provides power on line 105 to drive the illumination for backlighting the LCD display 54 and audio signals on line 107 to the audio indicator or speaker 104.

The retailer module 38, customer module 48 and ticket dispensers 58 are distributed in three different locations with respect to the counter 20; and the retailer module 38 and customer module 48 are being operated by different persons at different times. However, it is necessary that the process of purchasing game tickets, selecting game tickets and dispensing game tickets be carried out in a coordinated manner, which means under a central control. In the ticket dispensing system 29, the retailer module 38 is the master controller of the system. Since the retailer and customer modules 38, 48 are together performing most, if not all, of the same tasks that are currently being performed by integrated standalone ticket dispensers, the normal operation of the system will be described to the extent that the nature of the operations of the retailer and customer modules will be understood. It is not believed necessary to describe in detail every operation of the modules 38, 48 for one of ordinary skill to understand the present invention.

Figure 5:
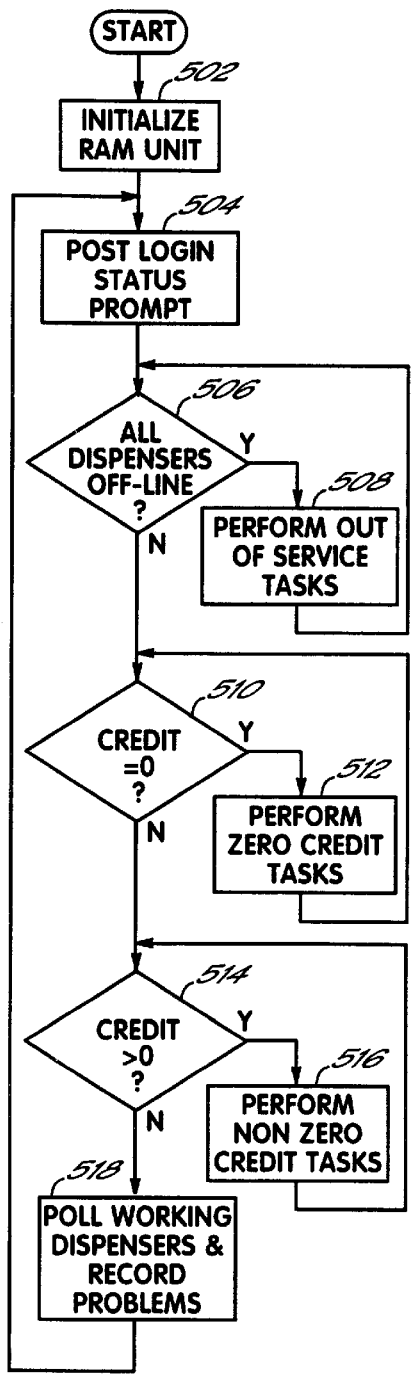
FIG. 5 is a flow chart illustrating an item dispensing portion of the operation of the retailer access module in accordance with the principles of the present invention.

In use, the first operation is to apply power to the system. Referring to FIGS. 3 and 5, when power is supplied to the ticket dispensing system 29, the retailer access module 38 at 502 performs a self-initialization as well as providing data for initializing other components. More specifically, the microcontroller 74 initializes or provides default values for all of the boards and components within the retailer module 38. Further, the microcontroller 74 establishes communication links over the cables 66 to the ticket dispensers 58 and customer module 48; and in the process, provides initialization and default values to those units. Utilizing the "I²C-BUS" serial data protocol, the microprocessor 74 fabricates packets of data and transfers them to, and receives packets of data from, the customer module 38 and the ticket dispensers 58. The composition and transfer of the data packets is in accordance with the "I²C-BUS" protocol. Therefore, on a regular basis, the microprocessor 74 is sending a data packet to the customer module 48 that either provides information to, or requests status information from, the customer module 48. The initialization step 502 tests other components in the system, for example, the motors within the ticket dispensers 58.

Figure 6:
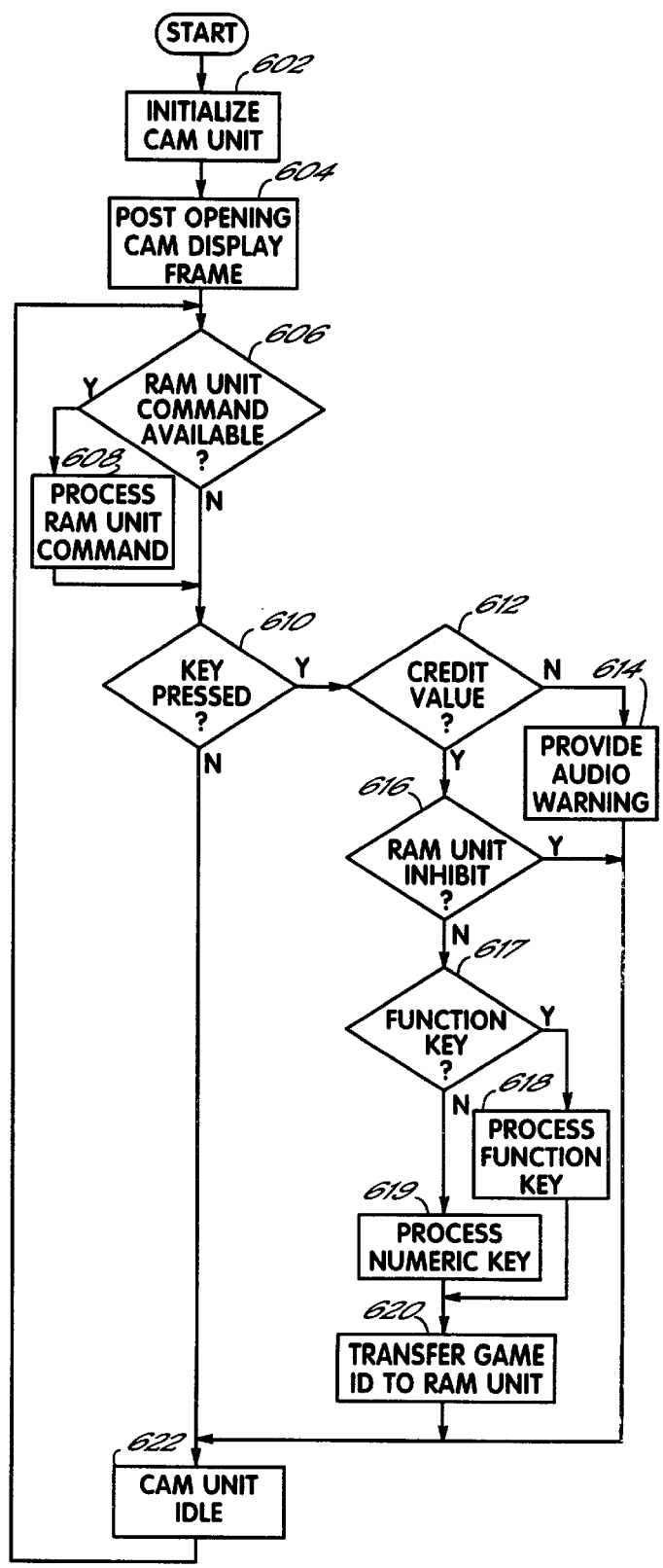
FIG. 6 is a flow chart illustrating an item dispensing portion of the operation of the customer access module in accordance with the principles of the present invention.

Referring to FIGS. 4 and 6, upon power being applied to the customer module 48, the microcontroller 96 at 602 establishes default values and otherwise initializes serial ports 90, 92, the LCD display 54 and the LED's on the keypad 49. Then at 604, the processor 96 instructs the address decoder and glue circuitry 102 to transfer an opening display frame to the LCD display module of 54. The opening message is normally a technical identification of the module 48 and provides no game related information to the customer. The microprocessor 96 takes no further action until it receives a command from the retailer module 38 as detected at 606. The processor 96 then proceeds to process the command at 608. The command from the retailer module 38 may be a part of an initialization sequence, a status request, or information with respect to ticket pricing and inventory, etc. After the first command is successfully received from the retailer module 38 and the communication link has been successfully established, the system is considered to be online and operational. At that point, the processor 96 commands the circuitry 102 to provide another message to the display 54, for example, "Play the Lottery". The customer module 48 then simply idles awaiting further commands from the retailer module 38.

Referring back to FIG. 5, after the initialization is complete, the process at 504 awaits a login by a user. The retailer access module 38 has three different levels of password security, and the different levels of security require particular or unique password configurations. In addition, the different levels of security provide different levels of access to the ticket dispensing system, for example, a clerk normally has the lowest level of security and would be able to use the system to login and logout, enter credit values,. that is, customer purchase values, and print some reports. A manager or system supervisor normally has a higher level of security and correspondingly greater access to the system and, for example, may, in addition to the clerk's functions, be able to load and enter inventory and collect reports. The highest level of security providing the greatest access to the ticket dispensing system is normally reserved for service agents who have the requirement and ability to run test routines and perform system diagnostics.

Assume for purposes of this example, that a retail clerk has logged into the system at process step 504. The microprocessor 74 then at 506 checks whether all of the dispensers are off line. If any one ticket dispenser 58 continues to be online, then game ticket sales may continue. If no dispensers are online, then the microprocessor 74 moves to execute the out of service tasks at process step 508. All of the ticket dispensers 58 may be offline because no tickets are loaded, the system is undergoing maintenance, a cable 66 is broken, etc. The principal out of service task of the processor 74 is to detect when the realtime clock 76 rolls over to the next day, that is, past 12:00 a.m. When a new day starts, several accounting tasks must be performed, for example, the accounting data stored in the NOVRAM 80 must be shifted back one day. For example, the reports may be selected as being related to the current date, for example, yesterday's report, last weeks report, etc. Therefore, when the realtime clock rolls over to a new date, the accounting data associated with today must be assigned to yesterday, and after Saturday midnight, this week's data is now considered to be last week's data, etc. The microprocessor 74 continues to perform the out of service tasks at 508 until at least one dispenser 58 is brought online.

When the microprocessor 74 detects that at least one dispenser is online, the processor then checks at 510 to determine whether the current credit value is zero. In the zero credit state, the ticket dispensing system 29 is available to sell tickets, but there is no current sales activity. This state is the normal idle state for the system. If the credit is determined to be zero, the microprocessor at 512 then performs the zero credit tasks. Such tasks include checking for the entry of a password, checking for the entry of a credit and, again checking the realtime clock for a date rollover, If the processor 74 detects that a credit has been entered, the process at 514 then moves to execute the nonzero credit tasks at 516.

Figure 7:
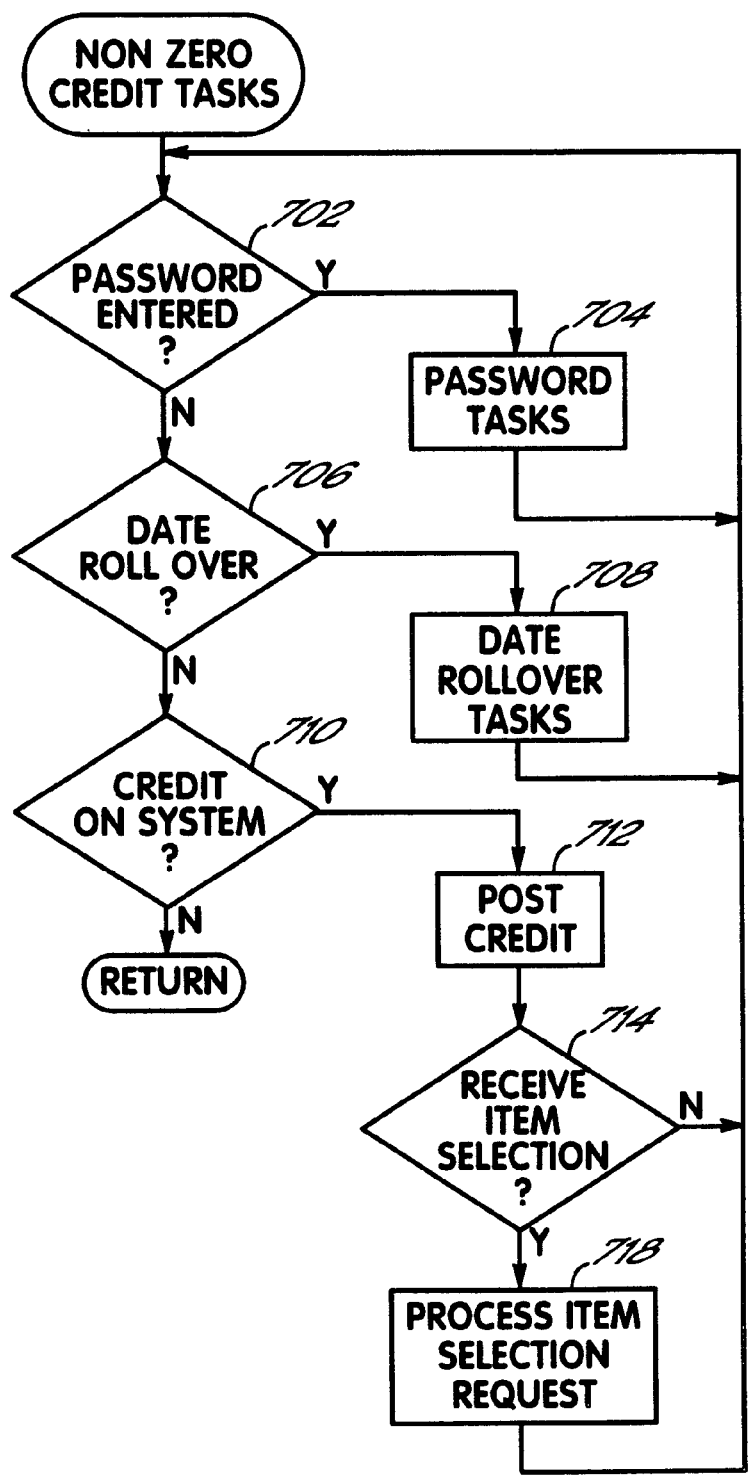
FIG. 7 is a flow chart illustrating an item dispensing portion of the operation of the retailer access module in more detail.

The major nonzero credit tasks are set forth in the flow chart of FIG. 7. As previously described, the processor at 702 detects whether another password has been entered. If so, the processor 74 then executes password tasks at 704. If not, the processor again tests at 706 whether the realtime clock has experienced a date roll over. If so, the date roll over tasks as previously described are executed at 708. If there has been no date roll over, the processor 74 determines at 710 whether there is any credit on the system, that is, whether the clerk has entered into the retailer access module 38, a credit amount equal to a payment made by a customer to purchase tickets. If a credit value is detected, the microprocessor 74 in the retailer module 38 then posts the credit at 712. In posting the credit, the microprocessor 74 enters the credit value in the NOVRAM 80 and causes the decoder and glue circuit 86 to provide an output to the display module 44 to display the credit value to the retail clerk.

In addition, the microprocessor 74 prepares a data packet including the credit value which is transferred over the cables 66. Referring to FIG. 6, the customer module receives the data packet; and at 606, the processor 96 detects the presence of the credit value transferred by the retailer module 38. The processor 96 then instructs the circuitry 102 to provide the credit value to the display 54. Upon viewing the credit amount in the display 54 of the customer module 48, the customer then knows to begin the selection of game tickets, the total value of which is to equal the displayed credit value. The customer module 48 detects at 610 whether one of the numeric keys 50 or one of the function keys 52 on the keypad 49 is being pressed by the customer. If a key actuation is detected the processor 96 then at 612 checks whether a credit value exists. If one of the game keys 50 is pressed, but the retailer module 38 has not provided the customer module 48 with a credit amount, the keystroke cannot be accepted. In this situation, the processor 96 at 614 causes the address decoder and glue circuitry 102 to provide a signal to the audio indicator 104 which, in turn, produces an audio warning tone or beep.

If a credit value exists, the processor 96 at 616 determines whether the retailer module has transmitted an inhibit command to the customer module 48. If the retailer module 38 is processing a previous keystroke from the customer module 48; and the successful processing of the keystroke depends on the operation of another device, for example, the ticket dispenser 58, the system cannot accept any additional game selections from the customer until the previous selection has been successfully processed. Therefore, immediately upon receiving a keystroke from the customer module of 48, the retailer module 38 transmits a data packet including an inhibit command back to the customer module of 48. When the retailer module 38 receives an acknowledgment from the ticket dispensers 58 indicating that a dispense ticket command has been received, the retailer module 38 then transmits a cancel inhibit command to the customer module 48. The retailer module 38 will subsequently check for a successful ticket dispensing operation.

Upon receipt of the cancel inhibit command, microprocessor 96 at 617 then determines whether the pressed key is one of the function keys 52. If so, the processor 96 at 618 processes the function key. In this example, the processor 96 commands the circuitry 102 to provide a message to the display instructing the customer to press a numeric game key, for example, "Select a Game". The process then loops through the process just described with respect to process steps 606–616; and if, at 617, a function key is not detected, the processor 96 at 619 processes the numeric key. That processing is basically to decode and identify the item or game associated with the numeric key. Thereafter, the processor 96 at 620 transfers a data packet including that game identification to the retailer module 38 in response to the next status request received from its microprocessor 74. The processor 96 then updates the credit value for the customer module 48. In updating the credit value, the processor 96 subtracts the value of the selected game ticket from the original purchase value; and instructs the circuit 102 to display the updated credit in the display 54 for the customer. The customer module 48 then at 622 returns to its idle mode in which it manages the display frames. With a credit present and being displayed, the module 48 will normally not change the state of the display.

Knowing that a credit exists, the retailer module 38 next expects to receive a keystroke from the customer module 48 representing the identity of a particular game selected by the customer. If at 714, the processor 74 detects the receipt of a game identification, it then proceeds at 718 to process the game selection request. Under normal circumstances the microprocessor 74 prepares and sends a data packet with a dispense command to an appropriate one of the dispensers 58, and also send an inhibit command data packet to the customer module 48. If the ticket is available, the one of the dispensers 58 dispenses the ticket which makes it available to the retail clerk for collection and presentation to the customer. Any irregularity in the dispensing process, for example, a jam, is detected by the dispenser 58 and a state signal representing that condition is transmitted over the cable 66 to the retailer module 38. In addition, upon receiving the dispense command, the dispenser 58 sends an acknowledgment to the retailer unit 38.

In some situations, the ticket dispenser may be empty and that zero inventory condition is transmitted back to the microprocessor 74. The microprocessor 74 then prepares a data packet for the customer module 48 that includes a game offline command indicating the zero inventory condition. The game offline may also arise because the selected dispenser 58 is down for maintenance or if there is a communication problem with the dispenser 58. Referring to FIG. 6, the microprocessor 96 detects at 606 the receipt of the game offline command, and at 608, the command is processed. Upon receipt of the game offline command, the microprocessor 96 within the customer module 48 turns OFF the LED next to one of the keys 50 on the keypad 49 that is associated with the game that is offline. In addition, the microprocessor 96 causes the address decoder 102 to provide a message to the LCD display 54 that requests the customer to "Play Another Game". In addition, the microcontroller 96 will set a state variable within the customer access module 48 that will provide the same message to the customer for subsequent depressions of that same key. That state variable remains set until the microcontroller 96 receives a command from the retailer module 38 canceling the game offline command.

Returning to process step 718 of FIG. 7, when the retailer module 38 detects that the acknowledgment to the dispense command from the ticket dispenser 58, the processor 74 sends a release inhibit command to the customer module 48. The processor 74 then iterates through the nonzero credit tasks loop and checks for a password at 702, a date rollover at 706, and a credit on the system at 710. If the value of the game selection by the customer did not utilize all of the available credit, the processor 74 calculates the remaining credit, that is, the original credit less the value of the dispensed game ticket. At 512, the updated credit value is entered in the NOVRAM 80. The process of game ticket selection by the customer and ticket dispensing continues until the microprocessor 74 determines at 510 that the credit value is zero and then returns to the process illustrated in FIG. 4. The processor 74 then proceeds at 518 to poll the working dispensers 58 and record any detected problems. The retailer and customer access modules 38, 48 continuously iterate through the processes illustrated in FIGS. 5–7 for as long as power is applied to the system. When the customer module 48 is idling at 622 of FIG. 6, the processor 96 normally causes the address decoder and glue circuitry 102 to transmit a message to the LCD display module 54 requesting the customer to "select function or game." However, if the credit is zero, the processor 96 causes the display 54 to scroll through a number of default messages. The microprocessor 96 continuously iterates through the process steps 706–714 as long as power is applied to the customer module of 48.

The above description assumed that the customer was selecting only numeric keys, however, the customer module 48 includes several function keys 52 which may be used in combination with the number keys to select the game tickets. For example, one of the function keys may be used to select a predetermined number, for example, 5, tickets. After pressing that function key, the customer is then prompted by the display 54 to press a numeric game key. Upon a game key being selected, the processor 96 then creates five game identification data packets that are then serially transmitted to the retailer module 38. Another function key may be set up to choose different preselected number, for example, 10 tickets. The third function key may be used to play all of the selected games. A fourth function key may also be utilized to randomly select the available games until the credit amount is satisfied. With each of the other function keys, after the function key is pressed, the customer then selects a game key; and the processor 96 provides game identity data packets that correspond to the function key that was selected.

To review a normal transaction, a customer at the check out counter 20, desiring to purchase game tickets, gives the cashier an amount of money equal to the purchase. The retail clerk then uses the keypad of 41 to enter the amount of the transaction, that is, the credit due the customer. The microcontroller 74 within the RAM 38 detects and identifies the keys pressed by the retail clerk, posts the amount of the credit in the NOVRAM 80, displays the credit value in the retailer module display 44 and transfers the credit value to the customer module of 48. The processor 96 within the customer module 48 displays the credit value.

If the microprocessor 74 of the retailer module 438 detects that any of the ticket dispensers are off-line or, that there is no inventory of tickets in some of the ticket dispensers, that information is stored in the NOVRAM 80; and in addition, a game off-line command is transmitted over the cable 66 to the customer module 48. The processor 96 detects a game off-line command and sets a state variable with respect to that game. In addition, the processor 96 commands the address decoder and glue circuitry 104 to turn OFF an LED 53 next to a key 50 in the keypad of 49 associated with the off-line game. Thus, the customer knows that the game is unavailable and that the key is inactive.

When the credit amount is displayed by the LCD display 54 to the customer, the customer knows that online games represented by the active keys may be selected. Upon pressing a key, the microcontroller 96 transmits the game identity to the retailer module 38, and the microcontroller 74 responds with an inhibit to the customer module 48. The processor 74 then proceeds to command the appropriate ticket dispenser to dispense the selected ticket; and upon receiving an acknowledgment to the dispense command, the processor 74 removes the inhibit from the customer module 48. Simultaneously, the microprocessor 74 recomputes the current credit value and posts the new credit value in the NOVRAM 80 as well as the retailer display 44. The processor 96 in the customer module 48 also computes an up-to-date credit value and displays the new credit value in the display 54. That process continues until the customer has selected a number of tickets that brings the credit value to zero. The retail clerk then collects the dispensed tickets from the dispensers 58 and provides the tickets to the customer.

The retailer access module 38 may also be used in association with the printer 70 to provide a wide variety of reports. The NOVRAM 80 within the module 38 maintains a complete history of ticket sales in terms of when they were sold, which game tickets were sold, the value of the game tickets, the clerk on duty, etc. Further, many reports of the history of sales can be provided, for example, sales by the shift by the day, or by the week, etc.

The item dispensing system 29 of the above described invention provides a distributed, modular and scalable item dispensing system that has many features making it especially suitable for point-of-sale counters. First, the present invention provides a game ticket purchase and dispensing system that is very automatic, very secure and has a high level of reporting. Thus, with the system automatically calculating the credit remaining, there should be no math mistakes. Further, the automatic dispensing should eliminate mistakes in accidentally dispensing too many tickets. With the tickets locked in their dispensers, ticket theft is minimized if not eliminated.

By making the retailer and customer modules 38, 48 and the dispensers 58 self contained, stand-alone units, the units can be located at the POS counter 20 at any convenient location. For example, the customer unit 48 may be placed on the top surface 26 of the counter 20, or the unit 48 may be placed on another support at the counter, for example, a shelf on, or next to, the counter 20. Further, the customer unit 48 may be picked up and viewed at close range as required by customers.

Similarly, the retailer module 38 may be placed on the surface 26 of the counter 20, or it may be placed on another support at the counter 20 or adjacent the POS terminal, for example, a shelf on or next to the counter 20 or cash register. In addition, the modularity of the retailer module 38 permits it to be connected directly to a retailer POS terminal 33 FIG. 2) or its functions to be integrated within the retailer POS terminal.

The stand-alone modular construction further permits a high degree of scalability. That is, a different number of dispensers can be easily added and removed from the system 29 to accommodate different numbers of items to be sold and dispensed. The only practical limitation is the maximum number of dispensers established by the system design which is a matter of design choice. In addition, the dispensers 58 may be readily located at any convenient location. While it is generally considered most convenient to have the dispensers 58 at the counter 20, they do not have to be in the proximity of the counter 20. Further, each of the dispensers 58 may be placed in different locations at the convenience of the user.

The item dispensing system 29 of the present invention has a significant advantage in that by placing the system at the POS counter, the items to be sold are exposed to substantially more potential customers than is possible with existing systems. Thus, it is expected that significantly greater sales will be made.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, the serial POS printer 70 is described as having pass through ports and connected to the cables 66. However, if the POS printer 70 does not have pass through ports, it may be connected to the retailer module 38 using an RS-232 serial link. In addition, the "I$^2$C-BUS" communications protocol is used to transfer data over the cables 66; however, again, other communications protocols, for example, "CANBUS", "ESCHLON" or proprietary protocols may be used.

Further, the ticket dispensing system as described above is not interconnected with the retail POS terminal, and all communications between the ticket dispensing system and the retail system, for example, the amount of the purchase, must be entered by a retail person in both the retailer module 38 and the retailer POS cash register 33. As will be appreciated, referring to FIG. 2, the retailer access module 38 may be connected by RS-232 lines 31, 32 to the retailer POS cash register or terminal 33 and a retailer modem 34. Similarly, the retailer access module 38 may be connected by an RS-485 line 35 to a retailer multidrop network terminal 36. With the retailer module 38 in communication with the cash register 33, the amount of the purchase only has to be entered once. In addition, with that and the other communications connections mentioned above, the inventory and sales data stored in the NOVRAM 80 can be integrated into the retailer's reporting system. Further, as will be appreciated, the whole function of the retailer access module 38 may be integrated into the retailer POS terminal 33; and in that embodiment, the retail module 38 will not exist as a separate unit.

The system disclosed in FIGS. 1 and 2 provide a passive display panel 30 and a separate customer unit 48 having a number of keys corresponding to the games presented in the display unit 30. As will be appreciated, the displays in the panel 30 can be individually made active, so that they respond to actions by the customer in selecting a game. In that embodiment, the display panel has the same capabilities as the numeric keys 50. In addition, and in a similar manner, the function keys 52 may also be integrated into the display panel 30. As will be appreciated, the components of the item dispensing system 29 may installed in an existing counter, or alternatively, the components may be installed in a counter module that is a complete dispensing system and installed as a complete POS counter unit. In a further embodiment, the passive display 30 need not be used, and instead, the items are displayed and selected using only the keys 50 of the customer module 48.

Therefore, the invention in its broadest aspects is not limited to the specific details shown and described. Consequently, departures may be made from the details described herein without departing from the spirit and scope of the claims which follow.

What is claimed is:

1. A method of dispensing items from an item dispenser at a point-of-sale counter comprising:

entering into an input device of a retailer unit a payment value for a purchase of items by a customer, the retailer unit being located at the point-of-sale counter;

transmitting the payment value from the retailer unit to a customer unit in electrical communication with the retailer unit, the customer unit being located at the point-of-sale counter;

displaying the payment value from the customer unit;

entering into an input device of the customer unit a selection of a first item to be purchased using the payment value; and dispensing the first item from the item dispenser.

2. The method of claim 1 further comprising providing a passive display providing an image of items dispensed by the item dispenser.

3. The method of claim 2 further comprising deactivating the customer unit in response to a 'difference value equaling zero.

4. The method of claim 1 further comprising:

displaying with the customer unit a difference value equal to a difference between the payment value and a value of the first item selected.

5. The method of claim 4 further comprising:

entering into the input device of the customer unit a selection of another item to be purchased using the payment value; and dispensing the other item from the item dispenser located with respect to the point-of-sale counter.

6. The method of claim 5 further comprising repeating until the difference value equals zero the step of displaying a difference value followed by the steps of entering into the input device of the customer unit a selection of another item to be purchased and dispensing the other item from the item dispenser.

7. The method of claim 6 further comprising deactivating the customer unit in response to the difference value equaling zero.

* * * * *